J. GEMMELL.
MINE SHAFT ROLLER.
APPLICATION FILED NOV. 13, 1914.
1,171,039.
Patented Feb. 8, 1916.
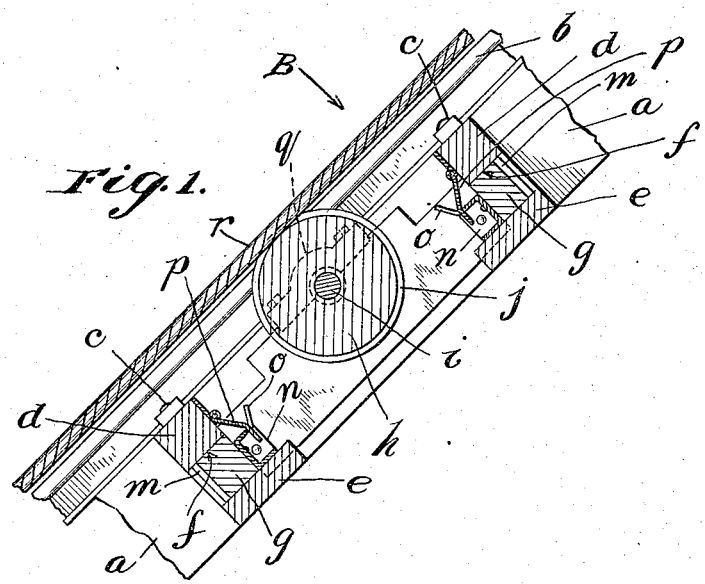
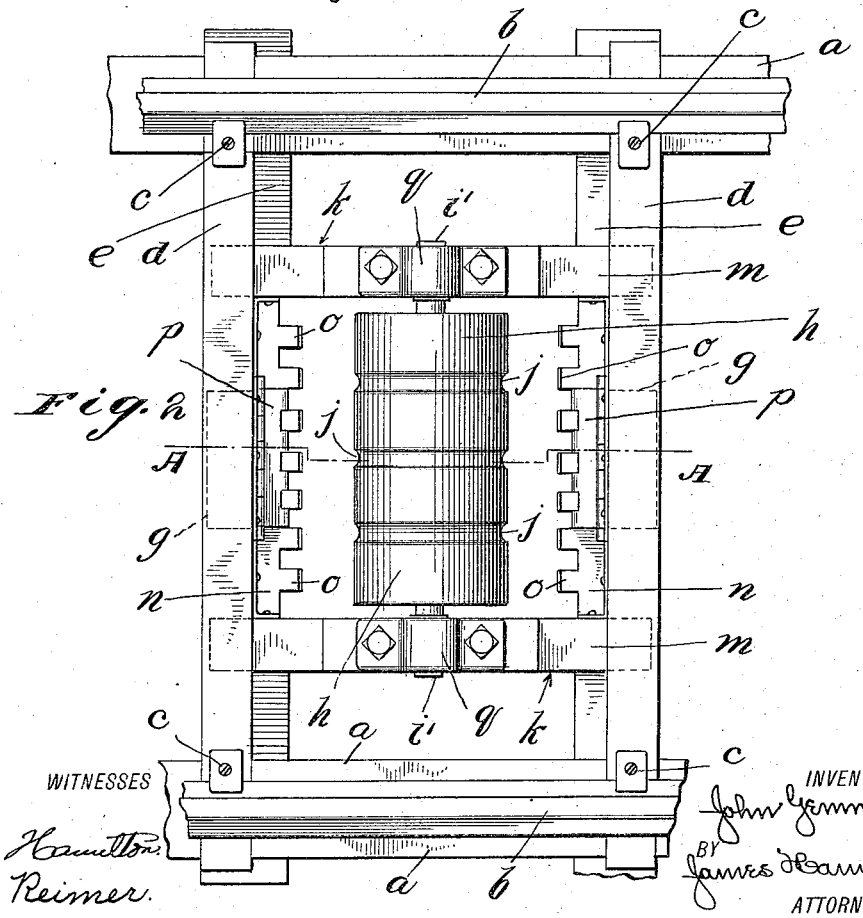
WITNESSES
M. Hamilton
M. Reimer
INVENTOR
John Gemmell
BY James Hamilton
ATTORNEY

UNITED STATES PATENT OFFICE.

JOHN GEMMELL, OF CALUMET, MICHIGAN.

MINE-SHAFT ROLLER.

1,171,039.          Specification of Letters Patent.      Patented Feb. 8, 1916.

Application filed November 13, 1914. Serial No. 871,872.

*To all whom it may concern:*

Be it known that I, JOHN GEMMELL, a subject of the King of Great Britain and Ireland, residing at Calumet, in the county of Houghton and State of Michigan, have invented certain new and useful Improvements in Mine-Shaft Rollers, of which the following is a specification, reference being had to the accompanying drawings.

This invention relates to improvements in shaft rollers and particularly to improvements in shaft rollers adapted for use in mines; and an object of this invention is to provide a shaft roller of the character just referred to which will be simple in construction, comparatively cheap in manufacture and efficient and durable in operation and use.

Another object of this invention is to provide a mine-shaft roller which will be susceptible of adjustment lengthwise of the roller.

In the drawings illustrating the principle of this invention and the best mode now known to me of applying that principle, Figure 1 is a section on the line A—A of Fig. 2; and Fig. 2 is a view looking in the direction of the arrow B of Fig. 1, the cable being omitted.

Upon each of the stringers or beams $a$ there is fastened a rail $b$ which does not differ materially from the ordinary railway rail; and, upon these rails $b$, there runs the skip or cage (not shown). To the beams $a$ there are suitably fastened (as by lag screws $c$) a pair of upper cross-pieces $d$ and a pair of lower cross-pieces $e$. Each upper cross-piece $d$ is separated from the lower cross-piece $e$ opposed to it by a space which forms a guideway $f$; and, near the middle of this guideway $f$, there is fastened a block $g$. The mine-shaft roller $h$ is mounted fast upon a spindle $i$ and is formed with circumferential grooves $j$. The roller $h$ is mounted upon a carriage $k$ the end-pieces $m$ of which are connected by a pair of side members $n$ formed with teeth $o$. Fastened to each of the upper cross-pieces $d$ is a toothed locking-member $p$ which is free to swing toward and from the toothed members $n$ of the carriage. The projecting ends $i'$ of the spindle $i$ are mounted free to rotate in the journal-boxes $q$ carried by the end-pieces $m$. The cable $r$ runs over the roller $h$ through one of the grooves $j$ thereof.

When it is desired to change the travel of the cable $r$ from one of the grooves $j$ to another thereof, the toothed hinged pieces $p$ are raised out of engagement with the toothed carriage members $o$, thereby permitting the carriage $k$ to be adjusted so as to bring one of the other grooves into position to receive the cable; and, after this adjustment has been made, the toothed members $p$ are swung back again into engagement with the toothed carriage members $o$.

I claim:

1. In a structure of the class described, the combination of a cable-railway; a cable for propelling the cars therealong; a cable roller over which said cable runs; a carriage upon which is mounted said roller and which is movable transversely of said cable-railway to vary the point of contact of said cable with said roller; and means for retaining said carriage in its adjusted position.

2. In a structure of the class described, the combination of a cable-railway; a cable for propelling the cars therealong; a cable roller over which said cable runs; a rack; a carriage upon which are mounted said roller and rack and which is movable transversely of said cable-railway to vary the point of contact of said cable with said roller; and means mounted on said cable-railway for engaging said rack to retain said carriage in its adjusted position.

Signed at Calumet, in the county of Houghton and State of Michigan, this 19th day of October, A. D., 1914, in the presence of the two undersigned witnesses.

JOHN GEMMELL.

Witnesses:
     JOHN D. KERR,
     EDITH M. BERRYMAN.

Copies of this patent may be obtained for five cents each, by addressing the "Commissioner of Patents, Washington, D. C."